US010798360B2

(12) United States Patent
Hiroi et al.

(10) Patent No.: US 10,798,360 B2
(45) Date of Patent: Oct. 6, 2020

(54) INFORMATION PROCESSING SYSTEM, METHOD FOR CONTROLLING SAME, AND PROGRAM

(71) Applicant: Sony Interactive Entertainment Inc., Tokyo (JP)

(72) Inventors: Jun Hiroi, Tokyo (JP); Osamu Ota, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/482,892

(22) PCT Filed: Mar. 23, 2017

(86) PCT No.: PCT/JP2017/011776
§ 371 (c)(1),
(2) Date: Aug. 1, 2019

(87) PCT Pub. No.: WO2018/173205
PCT Pub. Date: Sep. 27, 2018

(65) Prior Publication Data
US 2020/0267365 A1    Aug. 20, 2020

(51) Int. Cl.
*H04N 13/117* (2018.01)
*H04N 13/167* (2018.01)
*G06T 15/20* (2011.01)

(52) U.S. Cl.
CPC .......... *H04N 13/117* (2018.05); *G06T 15/20* (2013.01); *H04N 13/167* (2018.05)

(58) Field of Classification Search
CPC ..... H04N 13/117; H04N 13/167; G06T 15/20
See application file for complete search history.

(56) References Cited

U.S. PATENT DOCUMENTS

| 5,410,346 A * | 4/1995 | Saneyoshi | ................. B60R 1/00 348/116 |
| 2010/0056277 A1* | 3/2010 | Marks | ..................... G06F 3/017 463/36 |
| 2017/0076491 A1* | 3/2017 | Jiang | ....................... G06T 15/20 |

FOREIGN PATENT DOCUMENTS

| JP | 2002135807 A | 5/2002 |
| JP | 2006215939 A | 8/2006 |
| JP | 2007064836 A | 3/2007 |

OTHER PUBLICATIONS

International Preliminary Report on Patentability and Written Opinion for corresponding Application PCT/JP2017/011776, 11 pages, dated Oct. 3, 2019.

(Continued)

*Primary Examiner* — Marnie A Matt
(74) *Attorney, Agent, or Firm* — Matthew B. Dernier, Esq.

(57) ABSTRACT

In a system, first and second detection devices are provided in mutually different places in a real space and each configured to image the real space and obtain three-dimensional information including data of a distance to a predetermined point on an object provided in the real space and direction information as to a direction of a predetermined part of the object. The system generates information related to relative positions and installation directions of the first and second detection devices on the basis of: the data of the distance to the predetermined point on the object and the direction information regarding the object, the data of the distance and the direction information being obtained by the first detection device; and the data of the distance to the predetermined point on the object and the direction information regarding the object, the data of the distance and the direction information being obtained by the second detection device.

5 Claims, 5 Drawing Sheets

(56) References Cited

OTHER PUBLICATIONS

International Search Report for corresponding PCT Application No. PCT/JP2017/011776, 2 pages, dated May 23, 2017.

* cited by examiner (a)

(b)

(c)

INFORMATION PROCESSING SYSTEM, METHOD FOR CONTROLLING SAME, AND PROGRAM

TECHNICAL FIELD

The present invention relates to an information processing system, a method for controlling the same, and a program.

BACKGROUND ART

An information processing system that has been developed images a user using a plurality of cameras arranged at mutually different positions and obtains three-dimensional information regarding the user (information such as the position and posture of the user) in a real space by processing an image obtained by imaging. With this apparatus, it is possible to perform information processing for displaying, in a virtual space, a virtual three-dimensional image reflecting the three-dimensional information such as the position and posture of the user in the real space and provide the resultant information for information processing such as a game.

SUMMARY

Technical Problem

In order to for such information processing to be performed, relative positions of the plurality of cameras arranged at mutually different positions in the real space and information regarding the direction of view of each of the plurality of cameras need to be set. For this purpose, in the past, the user has measured the relative position of each camera and has set information obtained as the result of the measurement to the information processing system.

However, in order to implement such an information processing system using a home-use game machine, for example, it is necessary to force the user to perform the above-described measurement before the user plays a game. This places a heavy burden on the user.

The present invention has been made in view of the above-described circumstances. One of objects of the present invention is to provide an information processing system, a method for controlling the same, and a program that can facilitate settings for a process using a plurality of cameras.

Solution to Problem

One aspect of the present invention to solve the issue of the above-described related art example includes: first and second detection devices provided in mutually different places in a real space and each configured to image the real space and obtain three-dimensional information including data of a distance to a predetermined point on an object provided in the real space and direction information as to a direction of a predetermined part of the object; and means configured to generate information related to relative positions and installation directions of the first and second detection devices on the basis of: the data of the distance to the predetermined point on the object and the direction information regarding the object, the data of the distance and the direction information being obtained by the first detection device; and the data of the distance to the predetermined point on the object and the direction information regarding the object, the data of the distance and the direction information being obtained by the second detection device. The three-dimensional information regarding the object detected by each of the first and second detection devices whose information related to the relative positions and the installation directions has been generated is obtained and provided for a predetermined process.

Advantageous Effect of Invention

According to the present invention, it is possible to facilitate settings for a process using a plurality of cameras.

DESCRIPTION OF EMBODIMENT

Figure 1:
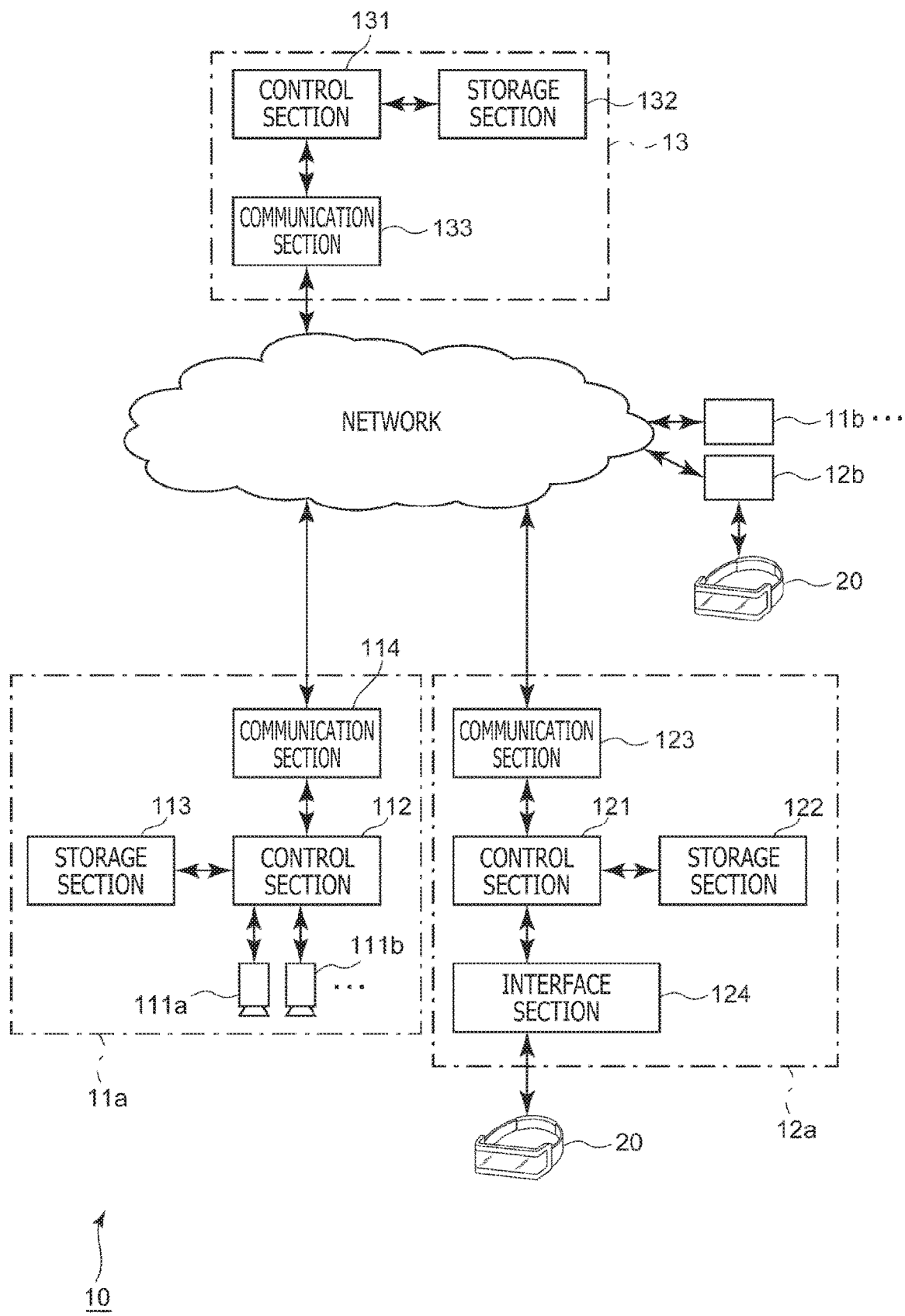
FIG. 1 is a block diagram illustrating an example of a configuration of an information processing system according to an embodiment of the present invention.

An embodiment of the present invention will be described with reference to the drawings. As exemplified in FIG. 1, an information processing system 10 according to the present embodiment includes imaging apparatuses 11a, 11b, . . . , display control apparatuses 12a, 12b, . . . , and a server apparatus 13. Each of a plurality of users is provided with a corresponding one of the imaging apparatuses 11a, 11b, . . . and a corresponding one of the display control apparatuses 12a, 12b, . . . . The server apparatus 13 is shared among the users. It is noted that in the following description, when the imaging apparatuses 11a, 11b, . . . and the display control apparatuses 12a, 12b, . . . do not need to be distinguished from each other, the imaging apparatuses 11a, 11b, . . . and the display control apparatuses 12a, 12b, . . . will be simply referred to as an imaging apparatus 11 and a display control apparatus 12, respectively. Further, the display control apparatus 12 is connected to a display apparatus 20 worn by a corresponding user.

It is noted that in the following description, the information processing system 10 according to the present embodiment obtains information regarding the posture of each of a plurality of users in a real space and arranges a corresponding three-dimensional model in a predetermined virtual space using the obtained information regarding the posture, thereby generating virtual space information. Each user is present within a predetermined range of the real space (referred to as a process target space). For example, each user is present inside the user's room.

In the present embodiment, the imaging apparatus 11 is provided for each user, and at least includes a plurality of cameras 111a, 111b, . . . (hereinafter referred to as a camera 111 in a case where the plurality of cameras 111a, 111b, . . . is not necessary to be distinguished from each other), a control section 112, a storage section 113, and a communication section 114. In the present embodiment, the cameras 111 are arranged in mutually different places in the process target space or in a real space adjacent to the process target space. Each camera 111 is installed so as to image the process target space including the corresponding user.

The camera 111 is a depth camera, for example. The camera 111 images an object in the real space in a predetermined direction of view from the position where the camera 111 is arranged, and outputs distance information while outputting the image obtained by imaging as data. At each point (each pixel) in the image data, the distance information is associated with information representing the distance to a subject imaged at the corresponding pixel. The direction of view of the camera 111 is set so as to image the range where the user is present from the position where the camera 111 is arranged.

Further, in the present embodiment, each camera 111 repeatedly performs imaging at each predetermined timing and sequentially outputs image data in a corresponding field of view, which has been obtained by imaging, and information regarding a distance to the subject imaged at each point in the field of view. Here, each of the cameras 111a, 111b, . . . , which are depth cameras, measures the distance to a target object imaged in a viewing coordinate system (a coordinate system of a quadrangular pyramid system with the center of the field of view at the top), and outputs information regarding the imaged object after performing perspective projection transformation. Specifically, in the present embodiment, the cameras 111a, 111b, . . . output distance information in respective $\xi\eta\zeta$ orthogonal coordinate systems (hereinafter referred to as local coordinate systems of the cameras 111) where lateral directions in the fields of view are respectively defined as $\xi a, \xi b, \ldots$, vertical directions in the fields of view are respectively defined as $\eta a, \eta b, \ldots$, and depth directions from the cameras 111 are respectively defined as $\zeta a, \zeta b, \ldots$, with the origins being at the respective positions of the cameras 111a, 111b, . . . (which may be the positions of the center of gravity).

It is noted that the scales of the axes are the same among the cameras 111. That is, the amount of change in the world coordinate system (the distance from before change) when $\xi a$ of the camera 111a has changed by "1" is the same scale as the amount of change in the world coordinate system when $\xi b$ of the camera 111b has changed by "1" (the same applies to each axis of $\eta$ and $\zeta$).

Figure 2:
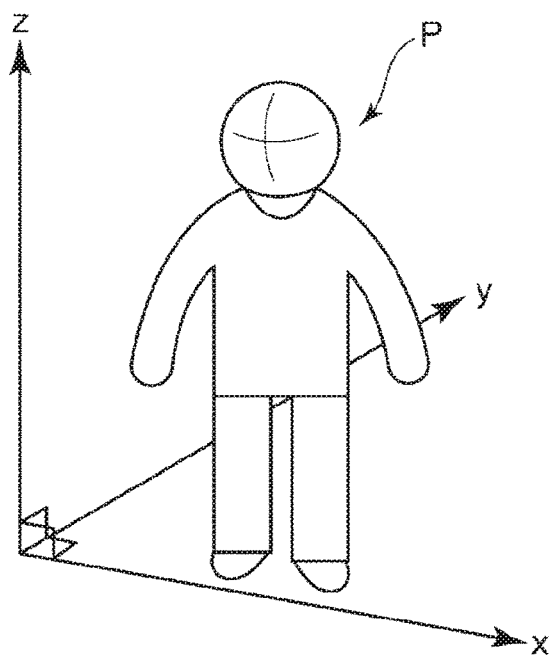
FIG. 2 is a diagram of assistance in explaining a setting example of a world coordinate system in the information processing system according to the embodiment of the present invention.

The control section 112 is a program control device such as a central processing unit (CPU) and operates according to a program stored in the storage section 113. In the present embodiment, the control section 112 receives input of the image data and distance information output from each of the plurality of cameras 111a, 111b, . . . . Further, the control section 112 generates information regarding each of mutual relative positions of the cameras 111a, 111b, . . . on the basis of the received image data and distance information. Further, the control section 112 generates three-dimensional information related to an object (specifically, the body of the user) in the process target space on the basis of the image data and distance information received from each camera 111, and transmits the three-dimensional information to the server apparatus 13. Here, the three-dimensional information is represented by, for example, an xyz orthogonal coordinate system (world coordinate system) virtually set in the process target space, as exemplified in FIG. 2. The three-dimensional information is an array of information regarding the color of the object (at least the surface of the body of a user P) or information representing the absence of the object in each block when the process target space is divided into small blocks having a predetermined shape (for example, cubic-shaped blocks; $xi<x<xi+1$, $yi<y<yi+1$, $zi<z<zi+1$). The operation of the control section 112 will be described in detail later.

The storage section 113 is a disk device, a memory device, or the like, and stores the program executed by the control section 112. Further, the storage section 113 also operates as a work memory of the control section 112. The communication section 114 is a network interface or the like, and transmits image data and distance information to the server apparatus 13 according to an instruction input from the control section 112.

The display control apparatus 12 includes a control section 121, a storage section 122, a communication section 123, and an interface section 124. Here, the control section 121 is a program control device such as a CPU, and operates according to a program stored in the storage section 122. In the present embodiment, the control section 121 receives virtual space information from the server apparatus 13 via the communication section 123. In the virtual space information, a three-dimensional model is arranged in a predetermined virtual space. Then, the control section 121 renders a drawn image of the virtual space viewed from the user using the virtual space information, the position of the user in the virtual space, and the information regarding the field of view of the user. The control section 121 outputs the image obtained by rendering via the interface section 124. In one example of the present embodiment, the control section 121 performs rendering to generate a drawn image (left-eye image) of the virtual space viewed from the position corresponding to the left eye of the user and a drawn image (right-eye image) of the virtual space viewed from the position corresponding to the right eye of the user, and outputs the resultant images to the display apparatus 20.

The storage section 122 is a disk device, a memory device, or the like, and stores the program executed by the control section 121. Further, the storage section 122 also operates as a work memory of the control section 121. The communication section 123 is a network interface or the like. The communication section 123 communicates with the server apparatus 13 to receive three-dimensional information and the like transmitted from the server apparatus 13 and outputs the three-dimensional information and the like to the control section 121. The interface section 124 is connected to the display apparatus 20 worn by the user, and outputs information regarding a drawn image to the display apparatus 20.

The server apparatus 13 is a server computer, and includes a control section 131, a storage section 132, and a communication section 133. The control section 131 is a program control device such as a CPU, and operates according to a program stored in the storage section 132. In the present embodiment, the control section 131 receives three-dimensional information transmitted by the imaging apparatus 11 of each user. In an example of the present embodiment, the control section 131 executes a game program and arranges a three-dimensional model in each of a plurality of predetermined positions in a virtual three-dimensional space (virtual space) defined by the game program. The three-dimensional model based on the three-dimensional information regarding a corresponding user represented by the three-dimensional information received from the imaging apparatus 11 of the corresponding user is arranged.

Here, for example, the three-dimensional model is generated as follows. That is, in one example of the present embodiment, the control section 131 of the server apparatus 13 maps the three-dimensional information regarding the user in the virtual space and arranges an image corresponding to the three-dimensional information regarding the user in the virtual space.

As one example, the control section 131 determines information regarding a color or information representing the absence of the object to be arranged at each point (which may be each grid point of (X1, Y1, Z1), (X2, Y1, Z1), . . . , (XN, Y1, Z1), (X1, Y2, Z1), . . . , (X1, Y1, Z2), . . . , (XN, YM, ZL) when the virtual space is represented by the XYZ orthogonal coordinate system) in the virtual space. Then, the control section 131 arranges a three-dimensional model element (virtual three-dimensional graphic element) at any grid point having information regarding a color to be arranged on the basis of the information. The three-dimensional model element has a predetermined shape (for example, a cubic shape) having the center of gravity at the corresponding grid point and is colored in the color represented by the information. Further, in a case where there is no object at the grid point, the control section 131 does not arrange anything at the grid point.

Information indicating whether or not the three-dimensional model element having the predetermined shape is arranged at each point in the virtual space, which is generated here, corresponds to one example of the three-dimensional model. According to the three-dimensional model of this example, voxels are arranged at least along the outline of the user.

Further, the three-dimensional model is not limited to this example. For example, the three-dimensional model may be information regarding a mesh representing an envelope surface that encloses grid points (grid points where an object is present) to which information regarding a color is set.

In this manner, the control section 131 of the server apparatus 13 may arrange the three-dimensional model of each user in the virtual space and may arrange a three-dimensional model (for example, a ball or the like) representing a virtual object necessary for the game process in the virtual space. The position of the ball or the like may be determined by physical calculation such as, for example, determination of collision with another three-dimensional model (the body of the user or the like), movement in the direction of gravity, settings of initial velocity, and the like. Since such game processes are widely known, a detailed description thereof is omitted here.

Further, the control section 131 of the server apparatus 13 distributes information regarding the virtual space in which various three-dimensional models are arranged to the display control apparatus 12 of each user.

The storage section 132 is a disk device, a memory device, or the like, and stores the program executed by the control section 131. Further, the storage section 132 also operates as a work memory of the control section 131. The communication section 133 is a network interface or the like, and outputs information received from the imaging apparatus 11 to the control section 131. Further, the communication section 133 also distributes information (information regarding the virtual space) input from the control section 131 to the display control apparatus 12.

The display apparatus 20 is, for example, a head mount display or the like worn by the user on the head. The display apparatus 20 displays image data output from the display control apparatus 12 to present the image data to the user. In one example of the present embodiment, the display apparatus 20 includes a plurality of markers 25 representing the back of the head, the side of the head, and the front (front direction) of the user with the display apparatus 20 worn by the user on the head. Each of the markers 25 may be a light emitting section having a predetermined shape, for example.

The display apparatus 20 may include, for example, a left-eye image display section 21 and a right-eye image display section 22. The left-eye image display section 21 is presented to the left eye of the user. The right-eye image display section 22 is presented to the right eye of the user. As described above, in one example of the present embodiment, the display control apparatus 12 outputs a left-eye image and a right-eye image. In this case, the display apparatus 20 outputs and displays the left-eye image on the left-eye image display section 21 while outputting and displaying the right-eye image on the right-eye image display section 22.

Next, the operation of the control section 112 of the imaging apparatus 11 will be described. In one example of the present embodiment, as described above, the control section 121 executes a process of generating information regarding mutual relative positions of the cameras 111 (relative position generating process) and a process of generating and transmitting three-dimensional information (three-dimensional-information generating process). Thus, these processes will be described separately.

<Relative Position Generating Process>

Figure 3:
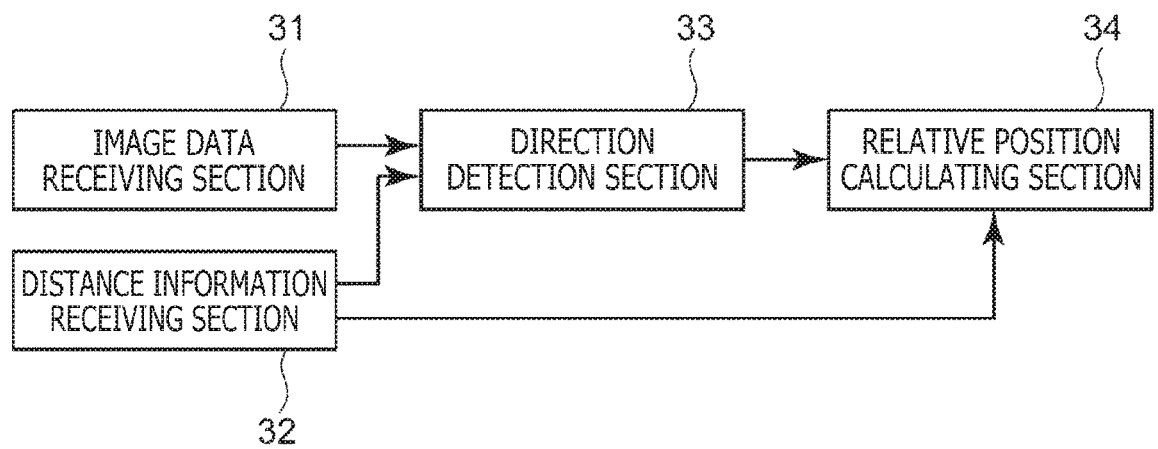
FIG. 3 is a functional block diagram illustrating one example of an imaging apparatus that performs a relative position calculation process according to the embodiment of the present invention.

The control section 112 according to one example of the present embodiment, which executes the relative position generating process, functionally includes an image data receiving section 31, a distance information receiving section 32, a direction detection section 33, and a relative position calculating section 34, as exemplified in FIG. 3.

The image data receiving section 31 receives image data output from each camera 111 at a predetermined point of time (that is, at a specific time), and outputs the image data to the direction detection section 33. The distance information receiving section 32 receives distance information output from each camera 111 at a predetermined point of time (that is, at a specific time), and outputs the distance information to the direction detection section 33 and the relative position calculating section 34.

The direction detection section 33 generates vector information on the basis of the image data that the image data receiving section 31 has received from each camera 111 at the predetermined point of time (that is, at the specific time) and the distance information that the distance information receiving section 32 has received at the predetermined point of time (that is, at the specific time) from each camera 111. The vector information represents a front head direction of the user imaged by the corresponding camera 111 in the local coordinate system of the corresponding camera 111.

In one example of the present embodiment, as described above, the display apparatus 20 worn by the user includes the plurality of markers 25. Therefore, the direction detection section 33 detects, for example, the marker 25 provided on the side of the head of the user and the marker 25 provided on the front side of the user from the image data output from each camera 111, and obtains information representing the type of the corresponding detected marker 25 (the type indicating whether the marker is the marker provided on the side part or the marker provided on the front side, for example) and coordinate information on the image data in which the marker 25 has been detected. Since such a marker detection process can use a widely known image recognition process, a detailed description thereof is omitted here.

That is, the direction detection section 33 detects and obtains the position ($\xi_i$, $\eta_i$) (i is an index assigned to each marker 25, and i=1, 2, ...) of each marker 25 of the display apparatus 20 in the image data (the positions of some markers 25 may be unknown). Then, the direction detection section 33 extracts, from the distance information, information regarding the distance to the subject (excluding the distance to the marker 25 whose position is unknown) in a position corresponding to each position in the image data.

The direction detection section 33 estimates the vector information ($\xi v$, $\eta v$, $\zeta v$) representing the direction of the head of the user on the basis of the obtained information ($\xi_i$, $\eta_i$, $\zeta_i$) regarding the position of each marker 25. As one example, the direction detection section 33 estimates the center position of the head of the user and calculates a vector connecting from the estimated center position to the position of the marker on the front side of the user to use the calculated vector as the vector information representing the direction of the head of the user.

It is noted that as to the estimation of the center position of the head of the user, in a case where markers on the left and right sides of the head of the user have been detected, the center position of the head of the user may be estimated as the average position therebetween, for example. Further, in a case where the position of the marker on the side of the head of the user and the position of the marker on the front side of the user have been detected, the process of estimating the center position of the head of the user may be performed on the basis of the distance to the marker on the front side and information regarding the position of the marker on the side of the head on the image data, for example. It is sufficient if each of the processes of estimating the center position of the head employs a corresponding predetermined method on the basis of the information as to the position of each of the detected markers. Further, as another method, the direction detection section 33 may estimate the center position of the head of the user by performing an image recognition process that recognizes the head of a human from the image data.

The direction detection section 33 outputs, to the relative position calculating section 34, the vector information ($\xi vj$, $\eta vj$, $\zeta vj$) (j=a, b, ...) that has been estimated on the basis of the image data and distance information input from each camera 111a, 111b, .... The vector information ($\xi vj$, $\eta vj$, $\zeta vj$) (j=a, b, ...) represents the direction of the head of the user in the local coordinate system of each camera 111.

The relative position calculating section 34 receives input of the vector information ($\xi vj$, $\eta vj$, $\zeta vj$) (j=a, b, ...) that has been estimated by the direction detection section 33 for each camera 111a, 111b, ... and that represents the direction of the head of the user as a predetermined part of the object in the local coordinate system of each camera 111. Further, the relative position calculating section 34 obtains, from the input image data, a predetermined position of the head of the user as a predetermined point on the object (which may be the position of the marker 25 of the display apparatus 20 provided on the front side of the head of the user, for example). This position may be obtained from the direction detection section 33 in a case where this position is a position detected by the direction detection section 33. Alternatively, this position may be obtained by the relative position calculating section 34 from the image data input through the image recognition process.

The relative position calculating section 34 obtains, for each camera 111a, 111b, ..., information regarding the position and direction of view of the camera 111 in the corresponding local coordinates with the origin being at the predetermined position of the head of the user as the predetermined point on the object on the basis of the information regarding the predetermined position of the head of the user obtained in the corresponding local coordinate system and the vector information ($\xi vj$, $\eta vj$, $\zeta vj$) representing the direction of the head of the user in the corresponding local coordinate system.

Figure 4:
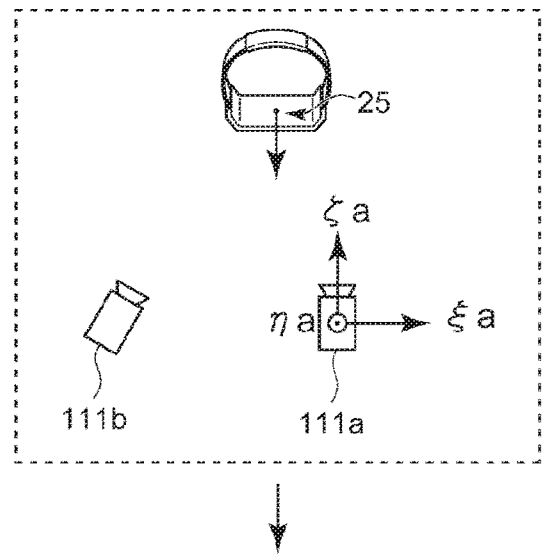
FIG. 4 depicts diagrams of assistance in explaining an overview of the relative position calculation process according to the embodiment of the present invention.
Figure 4:
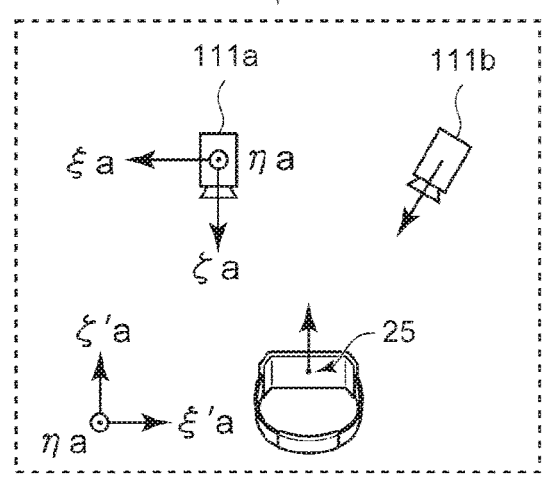
Figure 4:
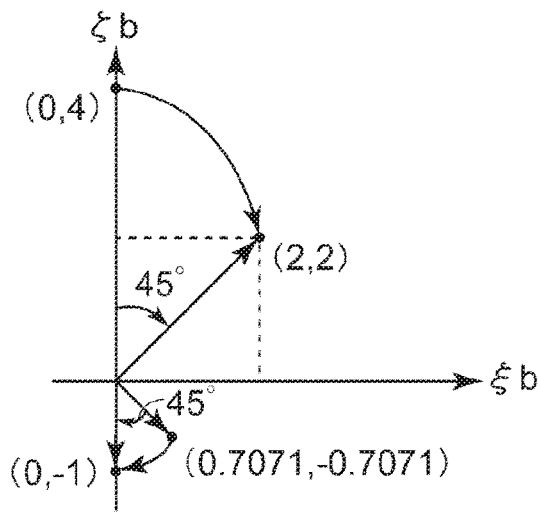

As one example, as illustrated in FIG. 4(a), the position of the head of the user in the local coordinate system of the first camera 111a is assumed to be (−1, 1, 3) and the direction of the head of the user is assumed to be (0, 0, −1). The position of the head of the user in the local coordinate system of the second camera 111b is assumed to be (0, 2, 4) and the direction of the head of the user is assumed to be (0.7071, 0, −0.7071) (it is noted that 0.7071=1/√2).

First, the relative position calculating section 34 calculates the position of the first camera 111a with the origin moved to the position of the head of the user in the local coordinate system of the first camera 111a. As one example, consider a state where the coordinates are rotated around the $\eta a$ axis (FIG. 4(b)). In this case, in the $\xi'a$, $\eta a$, $\zeta'a$ coordinate system ($\eta a$ remains unchanged since $\eta a$ does not change), which is a coordinate system after the origin has been moved to the position of the head of the user, the position of the first camera 111a is (−1, −1, 3) (the sign of $\eta a$ is reversed). Further, the direction is (0, 0, −1) with the signs of $\xi a$ and $\eta a$ reversed.

Next, the relative position calculating section 34 rotationally transforms the local coordinate system of the second camera 111b such that information regarding the direction of the second camera 111b matches the information regarding the direction of the first camera 111a. As illustrated in FIG. 4(c), the rotation transformation according to the example here corresponds to the transformation of rotation by −45 degrees around the $\eta b$ axis on the $\xi b$ and $\zeta b$ plane. Therefore, the relative position calculating section 34 calculates the position of the head of the user after the rotation transformation as (2, 2, 2) and the direction as (0, 0, −1) with the origin being at the second camera 111b.

Then, the relative position calculating section 34 calculates the position of the second camera 111b with the origin moved to the position of the head of the user in the local coordinate system of the second camera 111b. In this case as well, the process is similar to the process for the first camera 111a. Thus, the position of the second camera 111b with the origin moved to the position of the head of the user is (2, −2, 2). Further, the direction is (−0.7071, 0, −0.7071) with the signs of $\xi a$ and $\eta a$ reversed from the information regarding the direction before the rotation transformation.

In this manner, the local coordinate systems of the first camera 111a and the second camera 111b match each other with the origin thereof being at the position of the head of the user. Accordingly, information regarding relative coordinates of the first camera 111a and the second camera 111b can be obtained. In the above-described example, the positions of the first and second cameras 111a and 111b in the transformed local coordinate systems (which have matched each other) are (−1, −1, 3) and (2, −2, 2), respectively, and the directions (in this case, the directions of view) thereof are (0, 0, −1) and (−0.7071, 0, −0.7071), respectively.

Even in a case where there are three or more cameras 111, the relative position calculating section 34 performs similar processes to obtain information (coordinate information) regarding the relative position of each camera 111 in the xyz orthogonal coordinate system (world coordinate system) in which the direction of the head of the user is set to the z axis and the x axis is set parallel to the floor with the origin being at the head of the user as the predetermined point on the object. Further, the relative position calculating section 34 uses the coordinate information to obtain transformation parameter information for transforming the local coordinate system of each camera 111 into the world coordinate system. A transformation parameter information method performs transformation into the world coordinate system from the local coordinate system with the position of the origin in the world coordinate system and the $\zeta$ axis direction known. Since the transformation parameter information method is widely known, a detailed description thereof is omitted here.

<Three-Dimensional-Information Generating Process>

Figure 5:
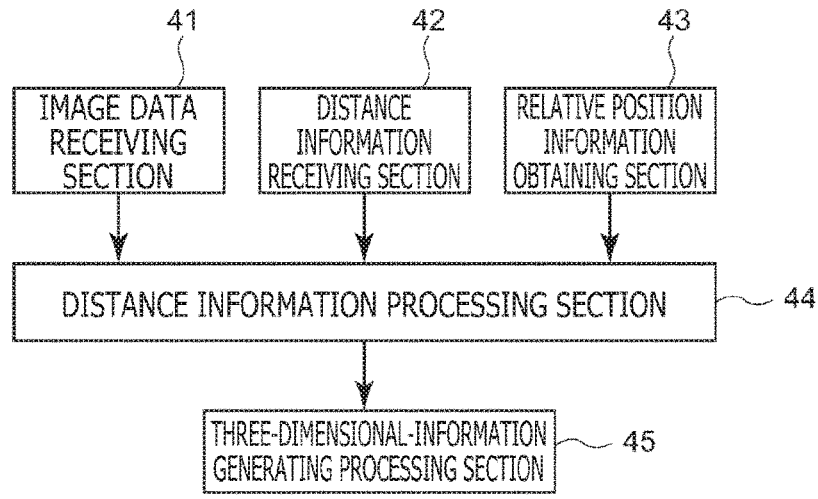
FIG. 5 is a functional block diagram illustrating one example of the imaging apparatus that performs a three-dimensional-information generating process according to the embodiment of the present invention.

Next, the three-dimensional-information generating process performed by the control section 112 will be described. As exemplified in FIG. 5, the control section 112 that executes the three-dimensional-information generating process according to the present embodiment functionally includes an image data receiving section 41, a distance information receiving section 42, a relative position information obtaining section 43, a distance information processing section 44, and a three-dimensional-information generating processing section 45.

The image data receiving section 41 receives image data sequentially output from each camera 111 and outputs the image data to the distance information processing section 44. The distance information receiving section 42 receives distance information sequentially output from each camera 111 and outputs the distance information to the distance information processing section 44. The relative position information obtaining section 43 obtains the transformation parameter information for transforming the local coordinate system of each camera 111, which has been calculated by the control section 112 through the relative position generating process, into the world coordinate system, and outputs the transformation parameter information to the distance information processing section 44.

On the basis of the distance information output from each camera 111, the distance information processing section 44 obtains, for each camera 111, information ($\zeta(\xi, \eta)$) regarding the distance to the subject at each point ($\xi, \eta$) in the field of view in the local coordinate system of the corresponding camera 111. Then, the distance information processing section 44 generates coordinates ($\xi, \eta, \zeta(\xi, \eta)$) of the surface of the imaged subject for each point ($\xi, \eta$) in the field of view in the corresponding local coordinate system. Then, the distance information processing section 44 obtains information regarding the color at the corresponding point ($\xi, \eta$) in the image data received by the image data receiving section 41, and stores the obtained color as information regarding the color at the coordinates ($\xi, \eta, \zeta(\xi, \eta)$).

The distance information processing section 44 uses the information regarding the relative position of each camera 111 output from the relative position information obtaining section 43 to transform the surface ($\xi, \eta, \zeta(\xi, \eta)$) of the imaged subject at each point in the field of view in the local coordinate system of each camera 111 into the value (x, y, z) of the world coordinate system with the origin being at the head of the user. Accordingly, the distance information processing section 44 can obtain, for each camera 111, the coordinates of the surface of the subject in the field of view of the corresponding camera 111 in the world coordinate system and the information regarding the color of the subject at the coordinates. The distance information processing section 44 outputs, to the three-dimensional-information generating processing section 45, the information regarding a set of the coordinates of the surface of the subject in the world coordinate system obtained for each camera 111 and the information regarding the color of the subject at the coordinates.

The three-dimensional-information generating processing section 45 records the coordinates in the world coordinate system included in the input information in association with the information regarding the color of the subject on the basis of the information regarding the set of the coordinates of the surface of the subject in the world coordinate system and the information regarding the color of the subject at the coordinates, which has been input from the distance information processing section 44. Specifically, the three-dimensional-information generating processing section 45 divides the process target space into small blocks having a predetermined shape (for example, cubic-shaped blocks; $xi<x<xi+1$, $yi<y<yi+1$, $zi<z<zi+1$) and records each information for identifying a small block, which includes the coordinates of the surface of the subject in the world coordinate system input from the distance information processing section 44, in association with the corresponding information regarding the color of the subject input with the corresponding coordinates as the set.

At this time, when the three-dimensional-information generating processing section 45 has obtained pieces of information regarding the color of the subject at the coordinates belonging to the same small block from the mutually different cameras 111, the three-dimensional-information generating processing section 45 selects one of the pieces of information as the color of the subject to be associated with the corresponding small block. Alternatively, the three-dimensional-information generating processing section 45 calculates the average value of the obtained pieces of information regarding the color and records the average value as the color of the subject in the small block corresponding to the coordinates.

In this manner, in the present embodiment, the information regarding the color at each of the small blocks virtually set in the process target space is set. It is noted that information representing the absence of the object is associated and recorded with any small block that is not recorded in association with the information regarding the color.

As the three-dimensional information, the three-dimensional-information generating processing section 45 outputs array data in which the information regarding the color of the subject or the information representing the absence of the object at each small block in the process target space is arrayed.

<Operation>

The information processing system 10 according to the present embodiment has the configuration described above and operates as follows. Each user of the information processing system 10 arranges the cameras 111 of the corresponding imaging apparatus 11 at a plurality of positions such that the cameras 111 can image a predetermined area in the real space where the user plays a game. At this time, the user adjusts the directions of the cameras 111 such that the cameras 111 can image the user.

Figure 6:
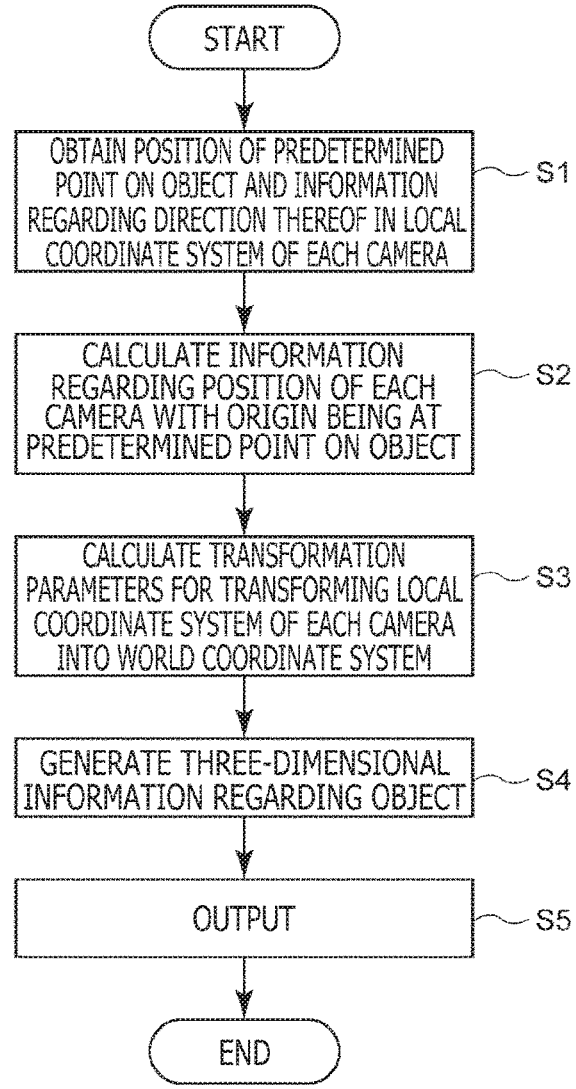
FIG. 6 is a flowchart illustrating an example of an operation of the imaging apparatus according to the embodiment of the present invention.

When the user wears the display apparatus 20 on the head and activates the imaging apparatus 11, the imaging apparatus 11 starts a process exemplified in FIG. 6. The control section 112 of the imaging apparatus 11 obtains the position of the head of the user as the predetermined point on the object imaged by each camera 111a, 111b, ... and information regarding the direction of the head of the user as information in the local coordinate system of each camera 111 (S1).

On the basis of the information obtained in the process S1, the control section 112 calculates information regarding the position and direction of view of each camera 111 at each local coordinates with the origin being at the predetermined position of the head of the user as the predetermined point on the object (S2). From the information calculated here, the control section 112 further calculates transformation parameter information for transforming the local coordinate system of each camera 111 into the world coordinate system (S3).

The control section 112 calculates information regarding the object at each point in the field of view in the local coordinate system of each camera 111 on the basis of the information output from each camera 111. The control section 112 transforms the coordinates into the world coordinates to obtain information regarding the object at each point in the world coordinate system, thereby generating three-dimensional information (S4).

The control section 112 provides the generated three-dimensional information for a predetermined process, for example, a game process (S5). Specifically, the control section 112 transmits the three-dimensional information generated here to the server apparatus 13 as the game process.

The server apparatus 13 arranges a three-dimensional model represented by the three-dimensional information received from the imaging apparatus 11 of each user at a corresponding one of a plurality of predetermined positions in the virtual three-dimensional space (virtual space) defined by the game program. As described above, the server apparatus 13 arranges each of three-dimensional models represented by the pieces of three-dimensional information received from the respective imaging apparatuses 11 of the users at a corresponding one of the positions determined by the method defined by the game program. The server apparatus 13 further arranges a three-dimensional model (for example, a ball or the like) representing a virtual object necessary for the game process in the virtual space, and determines the position of the ball or the like by physical calculation such as, for example, determination of collision with another three-dimensional model (the body of the user or the like), movement in the direction of gravity, settings of initial velocity, and the like. Then, the server apparatus 13 distributes information regarding the virtual space in which various three-dimensional models are arranged to the display control apparatus 12 of each user. It is noted that the server apparatus 13 includes the position of each user in the virtual space and the information regarding the field of view of each user into the virtual space information so as to be identifiable for each user.

The display control apparatus 12 receives the virtual space information in which the three-dimensional models are arranged in the predetermined virtual space from the server apparatus 13. The display control apparatus 12 uses the received virtual space information, the position of the user in the virtual space, and the information regarding the field of view of the user to render a drawn image of the virtual space viewed from the user and output the image obtained by rendering to the display apparatus 20 worn by the user.

One example of the present embodiment is configured in this manner. With this configuration, when each user arranges the plurality of cameras 111 in the user's room and activates the corresponding imaging apparatus 11, the imaging apparatus 11 obtains the predetermined point on the object such as a part of the body of the user and the direction of the predetermined point in the local coordinate system of each camera 111 and then calculates mutually transformable parameters therefrom. As a result, it is possible to obtain three-dimensional information regarding the corresponding user without forcing the user to perform troublesome installation work such as forcing the user to measure the positions where the cameras 111 are arranged.

<Another Example of Generating Relative Positions>

In one example of the present embodiment, as described above, the display apparatus 20 worn by the user detects the plurality of markers 25 to estimate the vector information ($\xi v$, $\eta v$, $\zeta v$) representing the position and direction of the head of the user as the predetermined point on the object. However, the present embodiment is not limited thereto.

For example, in one example of the present embodiment, the cameras 111 may include a skeleton tracking device. The skeleton tracking device estimates the position of each part of the body of the user, who is the subject, from image data and information such as the distance to the image, and calculates and outputs skeletal model data of the user (information such as the center of the head, the position of the cervical joint, the position of the shoulder joint, ... and the like). Since such a skeleton tracking device is widely known, a detailed description thereof is omitted here.

In this manner, in a case where the cameras 111 includes the skeleton tracking device, position information regarding a part closest to the predetermined point on the predetermined object (in the above-described example, the position of the head of the user, specifically the position of the marker 25 of the display apparatus 20 on the front side of the head of the user) among pieces of position information regarding respective parts of the skeleton of the user obtained by the skeleton tracking device is used to calculate position information regarding the predetermined point on the object in the field of view of the corresponding camera 111 (position information in the local coordinate system of the camera 111 that is the skeleton tracking device).

In this case, the control section 112 can generally obtain the center position of the head of the user from the information regarding the skeleton model. Thus, the control section 112 calculates the position estimated as the position of the marker 25 of the display apparatus 20 located on the front side of the head of the user by offsetting the position information in the local coordinate system of the camera 111 that is the skeleton tracking device by a predetermined amount corresponding to the physique of a general user.

Further, the control section 112 can obtain information regarding a plane of the body of the user on the basis of pieces of position information regarding predetermined joints calculated by the skeleton tracking device. Accordingly, the control section 112 calculates the normal direction of this plane and estimates vector information ($\xi v$, $\eta v$, $\zeta v$) representing the direction of the predetermined point on the object with the side facing the camera 111 side as the front (or by determining the front with reference to the position of an elbow joint or the like).

Thereafter, processes similar to the processes described above are performed to obtain information regarding the position and direction of view of the corresponding camera 111 at each local coordinates with the origin being at the predetermined position of the head of the user on the basis of the information regarding the position of the head of the user as the predetermined part of the object and the vector information ($\xi vj$, $\eta vj$, $\zeta vj$) (j=a, b, ... ) representing the direction of the head of the user in the local coordinate system of each camera 111 that have been estimated for each camera 111a, 111b, ....

Then, information (coordinate information) regarding the relative position of each camera 111 in the xyz orthogonal coordinate system (world coordinate system) is obtained. In the xyz orthogonal coordinate system (world coordinate system), the direction of the head of the user is set as the z axis and the x axis is set parallel to the floor with the origin being at the head of the user as the predetermined point on the object. Further, transformation parameter information for transforming the local coordinate system of each camera 111 into the world coordinate system is obtained from this coordinate information.

<Another Example of Detecting Points on Object>

In addition, in another example of the present embodiment, the control section 112 may perform a segmentation process on image data obtained by each camera 111 to identify a predetermined attention part such as a part of the body of the user and extract a point (an edge part or the like) including predetermined features included in the attention part. The control section 112 may obtain information regarding the position corresponding to the same point (attention point) of the object from an image captured by each camera 111.

In this case, in a case where the control section 112 has obtained information regarding the direction of the extracted attention point on the basis of the information obtained by a part of the cameras 111 (referred to as a reference camera), the control section 112 can generate three-dimensional information regarding the object. On the basis of the generated three-dimensional information, therefore, the control section 112 may obtain transformation parameter information for transforming the local coordinate system of the camera 111 that is not the reference camera into the world coordinate system by calculating information regarding the relative position of the camera 111 with the origin being at the attention point.

Specifically, in a case where the control section 112 has obtained information regarding the position and direction of the attention point from information obtained by each of the first and second cameras 111a and 111b, the control section 112 obtains position information regarding each of the first and second cameras 111a and 111b with the origin being at the attention point and obtains information regarding the relative positions of the first and second cameras 111a and 111b. Then, the control section 112 obtains transformation parameter information for transforming the local coordinate systems of the first and second cameras 111a and 111b into the world coordinate system. The control section 112 generates three-dimensional information regarding the object by calculating information regarding the position of each point on the object in the world coordinate system on the basis of the information obtained by each of the first and second cameras 111a and 111b.

By contrast, in a case where a third camera 111c has not obtained the position or direction of the attention point, the control section 112 uses three-dimensional simultaneous localization and mapping (SLAM) method on the basis of the image data imaged by the third camera 111c to generate three-dimensional information regarding the object. Then, the control section 112 compares the three-dimensional information regarding the object generated on the basis of the information obtained by each of the first and second cameras 111a and 111b with the three-dimensional information regarding the object generated on the basis of the image data imaged by the third camera 111c and obtains a coordinate value in the world coordinate system corresponding to the point in the local coordinates of the third camera 111c. Then, on the basis of the coordinate value in the world coordinate system corresponding to the point in the local coordinates of the third camera 111c obtained here, the control section 112 obtains transformation parameter information for transforming the local coordinates of the third camera 111c into the world coordinate system.

<Another Example of Game Process>

Further, in the description above, the information processing system 10 transmits information obtained by the imaging apparatus 11 to the server apparatus 13 and the server apparatus 13 performs the game process. However, the present embodiment is not limited thereto.

Figure 7:
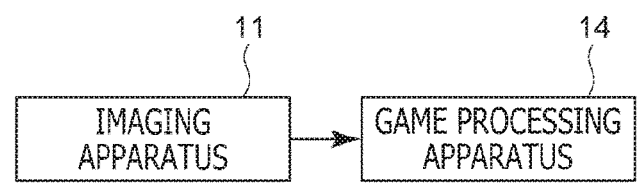
FIG. 7 is a block diagram illustrating another example of a configuration of the information processing system according to the embodiment of the present invention.

An information processing system according to one example of the embodiment of the present invention includes the imaging apparatus 11 and a game processing apparatus 14, as exemplified in FIG. 7. Here, since the imaging apparatus 11 is similar to the imaging apparatus 11 that has been described above, a repeated description thereof is omitted. The game processing apparatus 14 is a home-use game machine, for example. The game processing apparatus 14 receives input of three-dimensional information output from the imaging apparatus 11, arranges an object represented by the three-dimensional information in the virtual game space, and executes a predetermined game process. Further, the game processing apparatus 14 outputs image data, which is to be output in association with the game process, to a monitor connected to the game processing apparatus 14 or the display apparatus 20, causing the monitor or the display apparatus 20 to output and display the image data.

In this example of the present embodiment as well, when the user arranges the plurality of cameras 111 in a room where the user plays the game and activates the imaging apparatus 11, the imaging apparatus 11 obtains a predetermined point on the object such as a part of the body of the user and the direction of the object in the local coordinate system of each camera 111, and then calculates mutually transformable parameters therefrom. As a result, it is possible to obtain three-dimensional information regarding the user without forcing the user to perform troublesome installation work such as forcing the user to measure the positions where the cameras 111 are arranged. Accordingly, the three-dimensional information regarding the user can be used for the game process in the game processing apparatus 14.

<Estimation of Contact Position with Floor>

It is noted that the imaging apparatus 11 may recognize the floor on the basis of image data imaged by the camera 111 and the distance information and output coordinate information (for example, coordinate information regarding three points estimated to be present on the floor) in the world coordinate system representing the position of the floor.

The information regarding the position of the floor may be output to the server apparatus 13 or the game processing apparatus 14 and may be used as a reference position when the server apparatus 13 or the game processing apparatus 14 arranges a three-dimensional model of the user in the virtual space. Specifically, the server apparatus 13 matches the position corresponding to the ground or the floor in the virtual space with the position of the floor input from the imaging apparatus 11 and arranges the three-dimensional model of the object input from the imaging apparatus 11.

Alternatively, in a case where the cameras 111 of the imaging apparatus 11 include the skeleton tracking device, the imaging apparatus 11 may output the position (a coordinate value in the world coordinate system) of the foot bone of the user output from the skeleton tracking device as the information regarding the position of the floor. In this case as well, this information is used as a reference position when the server apparatus 13 or the game processing apparatus 14 arranges the three-dimensional model of the user in the virtual space.

According to this example of the present embodiment, information regarding the position of contact between the user and the floor detected for each of the users (each of the imaging apparatuses 11) is obtained by the corresponding imaging apparatus 11 and output to the server apparatus 13 or the game processing apparatus 14. The server apparatus 13 or the game processing apparatus 14 uses the information regarding the position of contact as the reference position when the server apparatus 13 or the game processing apparatus 14 arranges the three-dimensional model of the corresponding user in the virtual space. This makes a display reflect, for example, the height of the user in the virtual space and prevents an unnatural drawing in which a part of the user penetrates the floor, for example.

<Modification>

Further, in the description above, the imaging apparatus 11 and the display control apparatus 12 provided on the user side may be an integrated apparatus. In this case, each hardware resource may be shared; for example, the control section 112 and the control section 121 may be implemented by a shared processor. Similarly, the imaging apparatus 11 and the game processing apparatus 14 may be an integrated apparatus.

REFERENCE SIGNS LIST

10 Information processing system, 11 Imaging apparatus, 12 Display control apparatus, 13 Server apparatus, 14 Game processing apparatus, 20 Display apparatus, 21 Left-eye image display section, 22 Right-eye image display section, 25 Marker, 31 Image data receiving section, 32 Distance information receiving section, 33 Direction detection section, 34 Relative position calculating section, 41 Image data receiving section, 42 Distance information receiving section, 43 Relative position information obtaining section, 44 Distance information processing section, 45 Three-dimensional-information generating processing section, 111 Camera, 112, 121, 131 Control section, 113, 122, 132 Storage section, 114, 123, 133 Communication section, 124 Interface section.

The invention claimed is:

1. An information processing system obtaining and processing three-dimensional information regarding an object provided in a real space, the information processing system comprising:

first and second detection devices provided in mutually different places in the real space and each configured to image the real space and obtain the three-dimensional information including data of a distance to a predetermined point on the object provided in the real space and direction information as to a direction of a predetermined part of the object; and means configured to generate information related to relative positions and installation directions of the first and second detection devices on a basis of: the data of the distance to the predetermined point on the object and the direction information regarding the object, the data of the distance and the direction information being obtained by the first detection device; and the data of the distance to the predetermined point on the object and the direction information regarding the object, the data of the distance and the direction information being obtained by the second detection device, wherein the three-dimensional information regarding the object detected by each of the first and second detection devices whose information related to the relative positions and the installation directions has been generated is obtained and provided for a predetermined process.

2. The information processing system according to claim 1, wherein the predetermined process generates virtual space information by arranging a predetermined three-dimensional model element at least at each point in a virtual space corresponding to each position on the object, and uses the virtual space information generated to generate an image obtained by rendering an image viewed from a viewpoint of a user and present the image to the user.

3. The information processing system according to claim 1, further comprising:

a third detection device provided in a place different from the places of the first and second detection devices in the real space and configured to image the object provided in the real space and obtain the three-dimensional information regarding the object in the real space, wherein the means is configured to generate information related to a relative position and an installation direction of the third detection device relative to the first and second detection devices by comparing the three-dimensional information regarding the object formed on a basis of information obtained by each of the first and second detection devices with the three-dimensional information regarding the object formed on a basis of information obtained by the third detection device.

4. A method for controlling an information processing system obtaining and processing three-dimensional information regarding an object provided in a real space, the information processing system including first and second detection devices provided in mutually different places in the real space and each configured to image the real space and obtain the three-dimensional information including data of a distance to a predetermined point on the object provided in the real space and direction information as to a direction of a predetermined part of the object, the method comprising:

causing the information processing system to generate information related to relative positions and installation directions of the first and second detection devices on a basis of: the data of the distance to the predetermined point on the object and the direction information regarding the object, the data of the distance and the direction information being obtained by the first detection device; and the data of the distance to the predetermined point on the object and the direction information regarding the object, the data of the distance and the direction information being obtained by the second detection device; and causing the information processing system to obtain the three-dimensional information regarding the object detected by each of the first and second detection devices whose information related to the relative positions and the installation directions has been generated and provide the three-dimensional information regarding the object for a predetermined process.

5. A non-transitory, computer readable storage medium containing a computer program, which when executed by an information processing system, causes the information processing system to obtain and process three-dimensional information regarding an object provided in a real space, the information processing system including first and second detection devices provided in mutually different places in the real space and each configured to image the real space and obtain the three-dimensional information including data of a distance to a predetermined point on the object provided in the real space and direction information as to a direction of a predetermined part of the object, the computer program causing the information processing system to carry out actions, comprising:

generating information related to relative positions and installation directions of the first and second detection devices on a basis of: the data of the distance to the predetermined point on the object and the direction information regarding the object, the data of the distance and the direction information being obtained by the first detection device; and the data of the distance to the predetermined point on the object and the direction information regarding the object, the data of the distance and the direction information being obtained by the second detection device; and obtaining the three-dimensional information regarding the object detected by each of the first and second detection devices whose information related to the relative positions and the installation directions has been generated and provide the three-dimensional information regarding the object for a predetermined process.

* * * * *